US012729566B2

(12) United States Patent
Busemann

(10) Patent No.: US 12,729,566 B2
(45) Date of Patent: Sep. 8, 2026

(54) HOOP LOCK WITH WELDED-ON ARMORING

(71) Applicant: ABUS August Bremicker Söhne KG, Wetter-Volmarstein (DE)

(72) Inventor: Winfried Busemann, Driedorf (DE)

(73) Assignee: ABUS AUGUST BREMICKER SÖHNE KG, Wetter-Volmarstein (DE)

( * ) Notice: Subject to any disclaimer, the term of this patent is extended or adjusted under 35 U.S.C. 154(b) by 3 days.

(21) Appl. No.: 18/864,180

(22) PCT Filed: Mar. 23, 2023

(86) PCT No.: PCT/EP2023/057495
§ 371 (c)(1),
(2) Date: Nov. 8, 2024

(87) PCT Pub. No.: WO2023/217448
PCT Pub. Date: Nov. 16, 2023

(65) Prior Publication Data

US 2025/0163730 A1 May 22, 2025

(30) Foreign Application Priority Data

May 11, 2022 (DE) ..................... 10 2022 111 846.0

(51) Int. Cl.
*E05B 67/04* (2006.01)
*E05B 67/06* (2006.01)
(Continued)

(52) U.S. Cl.
CPC .............. *E05B 67/04* (2013.01); *E05B 67/06* (2013.01); *E05B 67/38* (2013.01); *E05B 71/00* (2013.01)

(58) Field of Classification Search
CPC ........ E05B 67/04; E05B 67/06; E05B 67/063; E05B 67/38; E05B 71/00
See application file for complete search history.

(56) References Cited

U.S. PATENT DOCUMENTS 3,453,846 A * 7/1969 Foote ...................... E05B 67/38 70/54
3,777,517 A 12/1973 Shwayder
(Continued)

FOREIGN PATENT DOCUMENTS

AU 2022356404 A1 5/2024
CN 1375362 A 10/2002
(Continued)

OTHER PUBLICATIONS

Rachida Rachidi et al: "Microstructure and mechanical characterization of NiCrBSi alloy and NiCrBSi—WC composite coatings produced by flame spraying" Materials Science & Engineering B 241 (2019), 13-21.

(Continued)

*Primary Examiner* — Christopher J Boswell
(74) *Attorney, Agent, or Firm* — Dickinson Wright PLLC

(57) ABSTRACT

A hoop lock includes a lock body, which includes a housing and a locking apparatus accommodated in the housing, and a closing hoop that has at least one end that can be selectively locked to the lock body or released from the lock body by way of the locking apparatus. An armoring is applied to the closing hoop and/or the housing of the lock body by way of buildup welding.

20 Claims, 7 Drawing Sheets

(51) Int. Cl.
*E05B 67/38* (2006.01)
*E05B 71/00* (2006.01)

(56) References Cited

U.S. PATENT DOCUMENTS

| | | | | | |
|---|---|---|---|---|---|
| 3,779,715 | A | | 12/1973 | Wendler | |
| 3,976,434 | A | * | 8/1976 | Shwayder | E06B 9/01 428/609 |
| 4,136,230 | A | | 1/1979 | Patel | |
| 4,561,272 | A | * | 12/1985 | Goldstein | E05B 67/06 70/417 |
| 4,893,487 | A | | 1/1990 | Johnson | |
| 5,417,092 | A | | 5/1995 | Iu | |
| 5,488,845 | A | | 2/1996 | Hsieh | |
| 9,512,640 | B2 | * | 12/2016 | Kyllonen | E05B 17/002 |
| 9,890,561 | B2 | * | 2/2018 | Perrenoud | B65D 83/141 |
| 12,428,876 | B2 | * | 9/2025 | Cato | E05B 67/24 |
| 2004/0093914 | A1 | * | 5/2004 | Vito | E05B 67/06 70/56 |
| 2005/0092038 | A1 | * | 5/2005 | Becker | E05B 67/063 70/53 |
| 2020/0011087 | A1 | | 1/2020 | Pankratius | |
| 2024/0011332 | A1 | * | 1/2024 | Kemper | E05B 15/16 |
| 2024/0344367 | A1 | * | 10/2024 | Abrahams | E05B 67/063 |
| 2024/0392605 | A1 | | 11/2024 | Barron | |

FOREIGN PATENT DOCUMENTS

| | | | | | |
|---|---|---|---|---|---|
| CN | 102400077 | A | | 4/2012 | |
| CN | 110847722 | A | | 2/2020 | |
| CN | 112662989 | A | | 4/2021 | |
| DE | 3540820 | A1 | | 5/1987 | |
| DE | 29903865 | U1 | | 5/1999 | |
| DE | 102010047020 | A1 | | 4/2012 | |
| DE | 102016116886 | A1 | | 3/2018 | |
| DE | 102018116434 | A1 | | 1/2020 | |
| DE | 202022002833 | U1 | | 9/2023 | |
| EP | 0675995 | B1 | | 10/1996 | |
| EP | 0638473 | B1 | | 5/1997 | |
| EP | 0689987 | B1 | | 4/1998 | |
| GB | 1377827 | A | | 12/1974 | |
| GB | 2618852 | A | | 11/2023 | |
| GB | 2621101 | A | | 2/2024 | |
| GB | 2621761 | A | | 2/2024 | |
| KR | 20240070665 | A | | 5/2024 | |
| RU | 2391440 | C2 | | 6/2010 | |
| WO | 9410414 | A1 | | 5/1994 | |
| WO | 2013017525 | A1 | | 2/2013 | |
| WO | 2015087067 | A1 | | 6/2015 | |
| WO | 2018138743 | A1 | | 8/2018 | |
| WO | 2019049092 | A1 | | 3/2019 | |
| WO | WO-2020056289 | A1 | * | 3/2020 | E05B 67/24 |
| WO | 2022195275 | A1 | | 9/2022 | |
| WO | 2023021302 | A1 | | 2/2023 | |
| WO | 2023052778 | A1 | | 4/2023 | |
| WO | 2023187416 | A1 | | 10/2023 | |
| WO | 2023223047 | A1 | | 11/2023 | |

OTHER PUBLICATIONS

Wallcolmonoy Corp. (USA), Surfacing Alloy Tech 1-K Selector Chart, 2020 Wall Colmonoy Corp. (USA).
A Nickel Based Blended Powder for the Plasma Transferred Arc (PTA) Process , EuTroLoy 16635G, Sep. 15, 2008, Eutectic Canada Inc.
A Nickel Based Blended Powder for the Plasma Transferred Arc (PTA) Process, EuTroLoy 16360G, Feb. 15, 2008, Eutectic Canada Inc.
Andrei Surzhenkov et al: "High Temperature Erosion Wear of Cermet Particles Reinforced Self-Fluxing Alloy HVOF Sprayed Coatings", ISSN 1392-1320 Materials Science (Medziagotyra). vol. 21, No. 3. 2015.
D. Deschuyteneer et al: "Processing and characterization of laser clad NiCrBSi/WC composite coatings—Influence of microstructure on hardness and wear", Surface & Coatings Technology 283 (2015) 162-171.
Anas Ahmad Siddiqui et al: "Recent trends in laser cladding and surface alloying", Optics and Laser Technology 234 (2021) 106619.
P.A. Dearnley: "Introduction to surface engineering", Cambridge University Press, www.cambridge.org/9780521401685, 2017.

* cited by examiner

HOOP LOCK WITH WELDED-ON ARMORING

FIELD

The present disclosure relates to a hoop lock comprising a lock body and a closing hoop. The lock body comprises a housing and a locking apparatus accommodated in the housing. The closing hoop has at least one end that can be selectively locked to the lock body or released from the lock body by way of the locking apparatus.

BACKGROUND

The closing hoop of such a hoop lock can, for example, have a U shape as is generally known from DE 299 03 865 U1, U.S. Pat. Nos. 5,417,092 A, 5,488,845 A, WO 94/10414 A1, DE 10 2018 116 434 A1, or EU design EM 002113266-0002.

Alternatively thereto, the closing hoop can also have a rectilinear shape as is, for example, generally known from WO 2006/109299 A2 or EP 2 333 204 A1 for padlocks, or generally known from DE 10 2005 043 926 A1 for brake disk locks, or generally known from DE 103 58 300 A1 or DE 10 2004 052 463 A1 for frame locks, or generally known from WO 2015/185380 A1 for scaffolding locks.

Furthermore, the closing hoop can also be configured in multiple parts, in particular with a plurality of members connected to one another in an articulated manner, for example, as a folding lock, as is generally known from EP 0 638 473 B1, EP 0 675 995 B1, or EP 0 689 987 B1.

For example, hoop locks serve to secure an object, for example a two-wheeler, e.g. to a bicycle stand, a fence, or a lamppost. When the closing hoop is unlocked, the closing hoop can be moved into an open position in which the closing hoop is released at one end or is also completely released from the lock body in order to form an open loop. Starting from the open position, the closing hoop can, for example, be led around a frame section of the two-wheeler and a bicycle stand, a fence, a lamppost or the like or the closing hoop is only led through a movable part (e.g. a rim, a brake disk) of the two-wheeler. The closing hoop can then be locked to the lock body in a closed position in order hereby to close the loop and thus to secure the two-wheeler against an unauthorized removal or an unauthorized riding away.

SUMMARY

It is an object of the present disclosure to provide a hoop lock that has an increased security against being broken open.

The object is satisfied by a hoop lock in accordance with the present disclosure and in particular in that an armoring is applied to the closing hoop and/or the housing of the hoop lock by way of buildup welding.

The hoop lock in accordance with the present disclosure includes a lock body and a closing hoop. The lock body can, in particular at an outer side, have at least one introduction opening that opens into an introduction passage for the closing hoop. The lock body further has a locking apparatus. The closing hoop can selectively be brought into an open position or a closed position relative to the lock body. The closing hoop can have at least one hoop end that, in the closed position of the closing hoop, projects through the respective introduction opening into the associated introduction passage of the lock body. In the closed position, the closing hoop can be locked to the lock body by the locking apparatus.

In other words, the hoop lock includes a closing hoop that can selectively engage into a lock body with one or more ends. In this closed position of the closing hoop, the closing hoop can be locked by way of a locking apparatus arranged in the lock body and can thus be secured against an unauthorized opening or a complete release from the lock body.

Thus, the closing hoop and the lock body can form a closed loop, for example. Through an authorized actuation of the locking apparatus, for example by way of a physical key or a code, the closing hoop can be unlocked and can subsequently be opened or released from the lock body.

Alternatively, the closing hoop can be substantially rectilinear. In some embodiments, the locking structure can be provided at one end of such a rectilinear closing hoop and a thickened portion can, for example, be provided at the other end, said thickened portion limiting the movability of the closing hoop.

A curved shaped of the closing hoop is also possible, for example a C shape of a rotatable closing hoop of a padlock or of a two-wheeler frame lock. In some embodiments, one end of the closing hoop can be permanently fastened to the lock body, in particular in a rotationally movable or pivotable manner.

In some embodiments, the locking apparatus of the lock body can have at least one movable latch, wherein the closing hoop can be locked to the lock body in the closed position by moving the respective latch into a locked position in which the latch enters into a locking engagement with the respective locking structure of the tube.

The locking apparatus can be designed purely mechanically, for example, with a key-operated lock cylinder. In some embodiments, the locking apparatus can be designed electromechanically, for example, with an electronic lock cylinder, an electric motor, or an electromagnet that drives the latch or latches.

In some embodiments, the lock body of the hoop lock can have an elongate shape, for example, with a circular, oval, or rectangular cross-section. The longitudinal shape can in particular be oriented perpendicular to the longitudinal axis of a U hoop.

It has been found that if a welded-on armoring is formed at the closing hoop and/or at the housing of the lock body of a hoop lock in accordance with the present disclosure, a complete cutting through of the closing hoop or of the housing by machining with a geometrically determined or undetermined cutting edge or by pinching is made impossible or at least substantially more difficult. Consequently, the hoop lock in accordance with the present disclosure is considerably better protected against any kind of portable break-open tools.

For increased protection against cut-through attempts, the armoring preferably comprises a hard metal.

Furthermore, the armoring can be formed in the form of at least one armor bead that in particular has a thickness between 0.5 and 5 mm, preferably a thickness between 1 mm and 2 mm, and/or a width between 5 mm and 10 mm.

In accordance with an embodiment, the armor bead can extend over at least approximately the total length of the housing and/or over at least approximately the total length of the closing hoop.

Furthermore, the armor bead can be a continuous armor bead or can be formed by a plurality of segments spaced apart from one another.

Furthermore, the armoring can be formed at a side surface, in particular an outer side surface, or an edge, in particular an outer edge, of the housing. Accordingly, the armoring can be formed at a side surface, in particular an outer side surface, or an edge, in particular an outer edge, of the closing hoop.

For example, the armoring can be formed centrally at at least one side surface of the housing, at at least one side surface of the housing offset from its center, in the region of at least one edge of the housing, partly or completely at at least one edge of the housing, and/or in a depression provided at a side surface of the housing. Furthermore, at least two side surfaces, in particular oppositely disposed side surfaces, of the housing and/or at least two side surfaces, in particular oppositely disposed side surfaces, of the closing hoop are provided with an armoring.

If the closing hoop is formed by a plurality of jointed bars connected to one another in an articulated manner, the armoring can be formed at at least one of the jointed bars of a jointed bar hoop. For example, the armoring can be formed at at least one narrow side of the jointed bar and/or in a depression provided at at least one side surface of the jointed bar.

The respective depression at a side surface of the housing or of the jointed bar can be bounded by a peripheral edge (i.e. an edge closed in the peripheral direction) of the housing or of the jointed bar that forms an elevated portion with respect to the base of the depression and surrounds the armoring. Thus, the armoring is additionally protected.

BRIEF DESCRIPTION OF THE DRAWINGS

The present disclosure will be described in the following by way of example with reference to advantageous embodiments and to the enclosed drawings. There are shown.

DETAILED DESCRIPTION

Figure 1A:
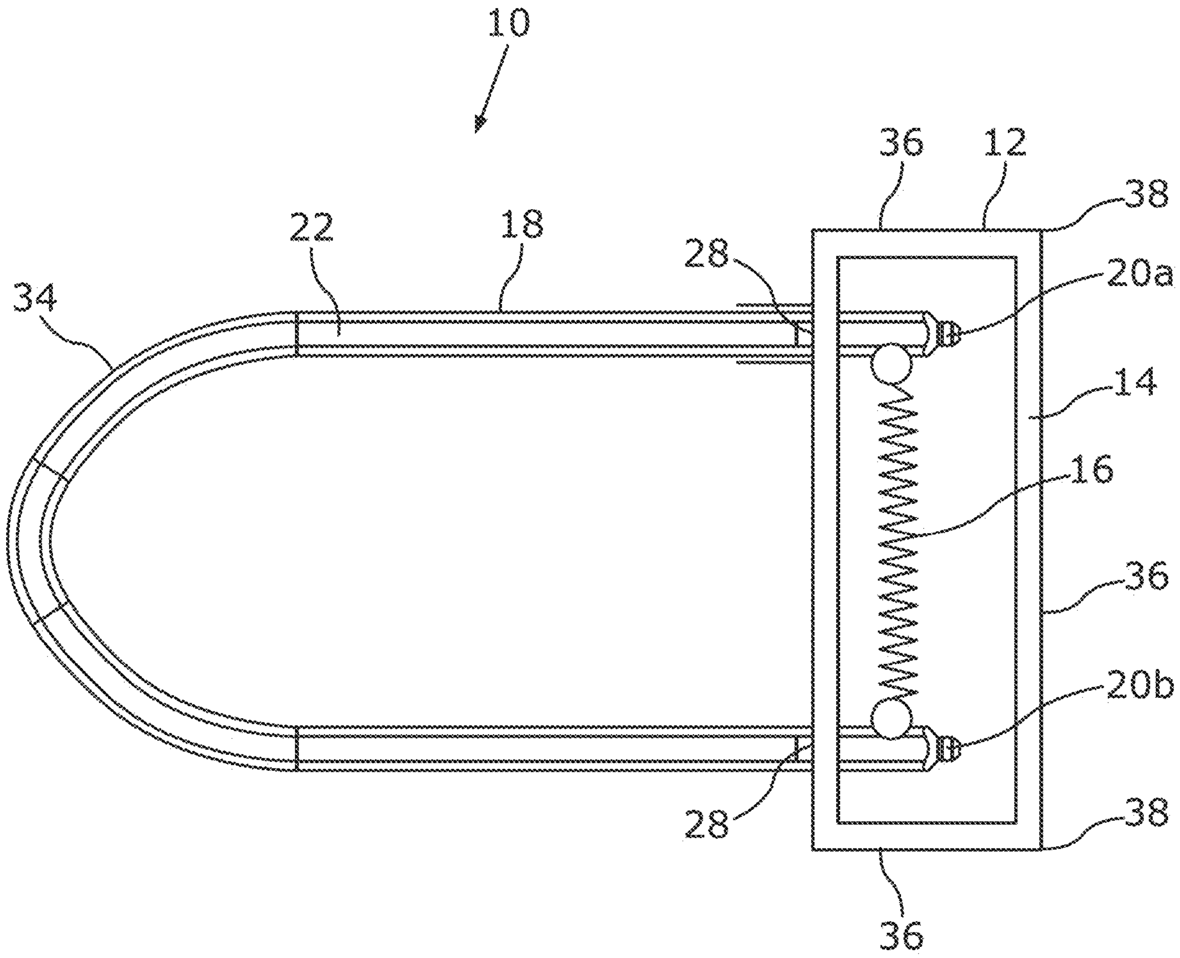
FIG. 1A a schematic plan view of a first embodiment of a hoop lock, wherein the hoop lock is a U hoop lock.

FIG. 1A shows a plan view of a first embodiment of a hoop lock 10 in accordance with the present disclosure that comprises a lock body 12 and a closing hoop 18. The lock body 12 includes a housing 14 and a locking apparatus 16 that is arranged in the housing 14 and that serves to secure the closing hoop 18 to the lock body 12. The housing 14 consists of metal and can additionally be surrounded by a plastic envelope (not shown). In the embodiment shown here, the closing hoop 18 is U-shaped and has a first end 20*a* and a second end 20*b* that can be introduced into respective closing openings 28 of the lock body 12 or can be led out of said lock body 12.

Figure 2A:
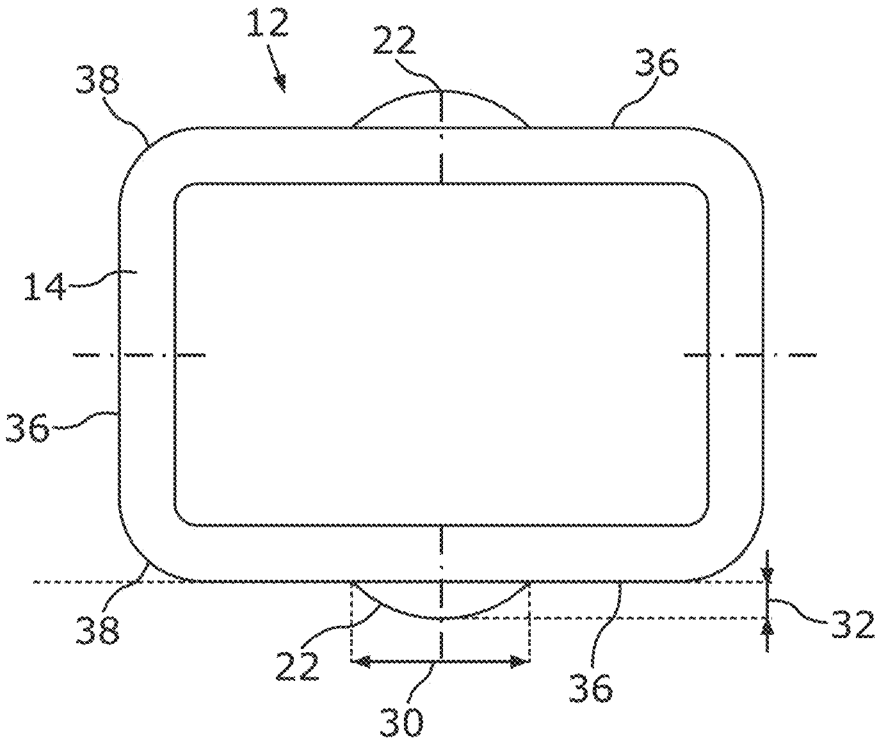
FIG. 2A a cross-sectional view of a first variant of a housing of a hoop lock of FIG. 1A or FIG. 3A, wherein a respective armoring is formed centrally at two oppositely disposed side surfaces of the housing.

To provide effective protection against unauthorized cutting-through attempts, the closing hoop 18 and the housing 14 of the lock body 12 have an additional armoring in the form of one or more armor beads 22. The armoring is applied by way of buildup welding, wherein the width 30 of an armor bead 22 is in a range between 5 mm and 10 mm and the thickness 32 of an armor bead 22 is in a range between 0.5 mm and 5 mm, in particular between 1 mm and 2 mm (FIG. 2A).

Figure 1B:
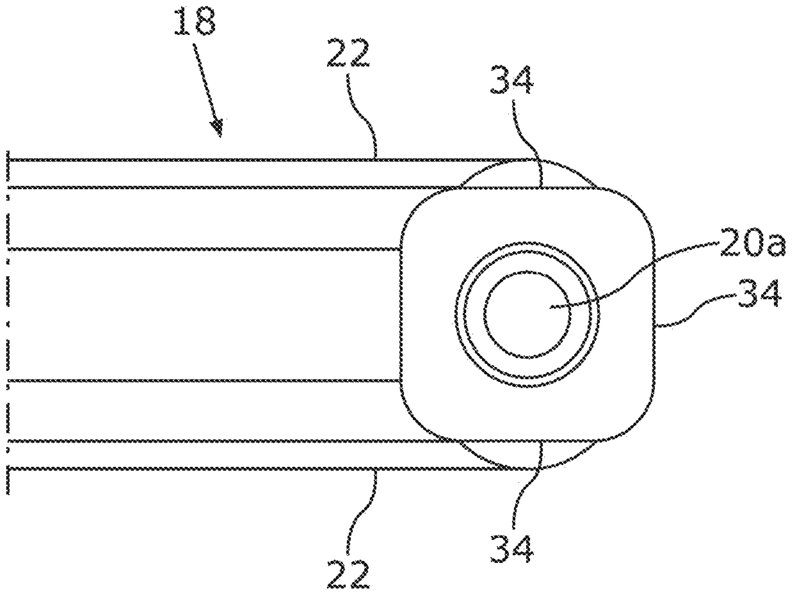
FIG. 1B a perspective view of an end region of a first variant of a closing hoop of the hoop lock of FIG. 1A, wherein an armoring is formed at two oppositely disposed side surfaces of the closing hoop.
Figure 1C:
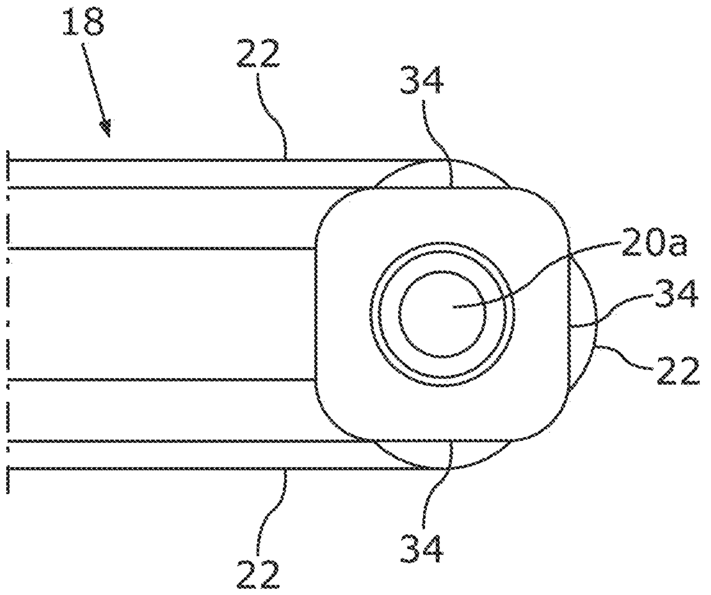
FIG. 1C a perspective view of an end region of a second variant of a closing hoop of the hoop lock of FIG. 1A, wherein an armoring is formed at three side surfaces of the closing hoop.

The armoring can be formed at one or more side surfaces of the closing hoop 18. For example, a respective armor bead 22 is formed at two oppositely disposed side surfaces of the closing hoop 18 (FIG. 1B) or a respective armor bead 22 is formed at three different side surfaces of the closing hoop 18 (FIG. 1C).

The armoring is in particular formed at at least one of the outer side surfaces 34 of the closing hoop 18. An outer side surface 34 of the closing hoop 18 denotes a side surface that is not located in the interior of the curvature of the closing hoop 18 (FIG. 1A). Since one of the outer side surfaces 34 is attacked or removed on an attempt to cut through the closing hoop 18, this arrangement of the armoring increases the robustness of the closing hoop 18 against unauthorized cutting-through attempts.

The armoring can further be formed at one or more side surfaces of the housing 14 of the lock body 12 and/or at one or more edges of the housing 14 of the lock body 12. If an armor bead 22 is formed at an edge of the housing 14, the armor bead 22 can be formed either completely at the edge or partly at the edge and partly at an adjacent side surface of the housing 14.

Figure 2B:
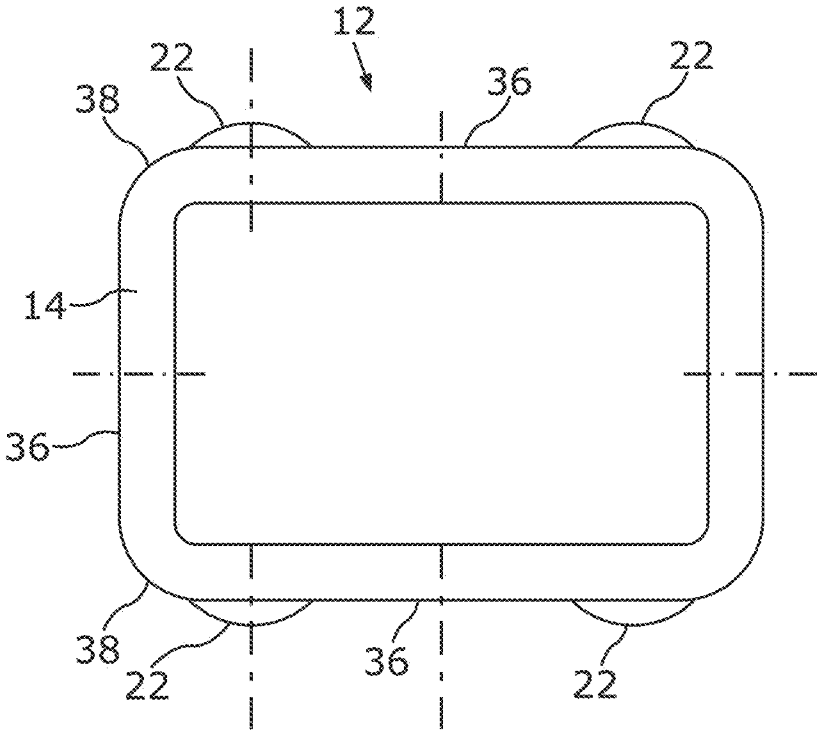
FIG. 2B a cross-sectional view of a second variant of a housing of a hoop lock of FIG. 1A or FIG. 3A, wherein a respective two armorings are formed at two oppositely disposed side surfaces of the housing.

For example, a respective armor bead 22 is formed centrally at two oppositely disposed side surfaces of the housing 14 (FIG. 2A). Alternatively, a respective two armor beads 22 spaced apart from one another are formed at two oppositely disposed side surfaces of the housing 14, wherein the armor beads 22 are equally spaced apart with respect to the respective centers of the side surfaces of the housing 14 (FIG. 2B).

Figure 2C:
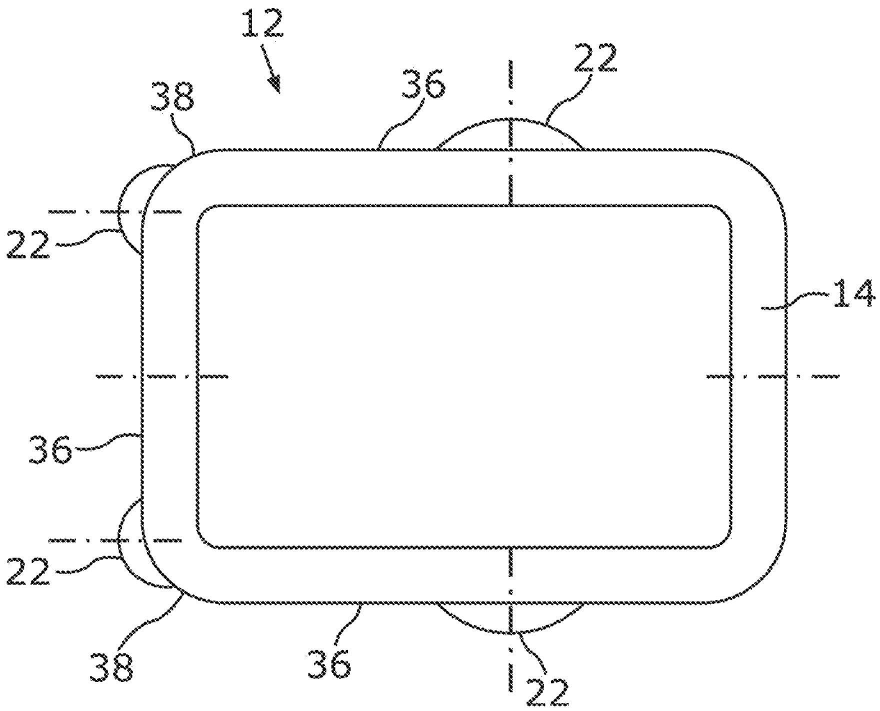
FIG. 2C a cross-sectional view of a third variant of a housing of a hoop lock of FIG. 1A or FIG. 3A, wherein a respective armoring is formed at two oppositely disposed side surfaces of the housing and a respective armoring is partly formed in the region of two adjacent edges of the housing.
Figure 2D:
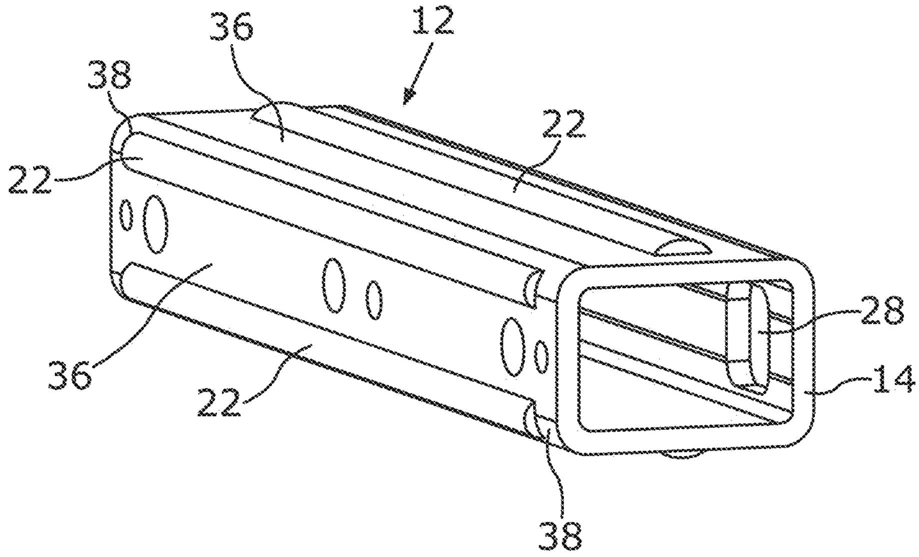
FIG. 2D a perspective view of the housing of FIG. 2C.

In accordance with a further variant shown in FIGS. 2C and 2D, a respective armor bead 22 is formed at oppositely disposed side surfaces of the housing 14 and a respective armor bead 22 is formed at two adjacent edges of the housing 14. In this respect, the armor beads 22 at the oppositely disposed side surfaces of the housing 14 are formed offset with respect to the respective centers of the side surfaces.

The armoring is in particular formed at at least one of the outer side surfaces 36 and/or partly or completely at at least one of the outer edges 38 of the housing 14. Here, an outer side surface 36 of the housing 14 denotes a side surface that adjoins the end face of the housing 14 that has the closing openings 28. Accordingly, an outer edge 38 of the housing 14 denotes an edge that does not adjoin the end face of the housing 14. Since, on an attempt to cut through the housing 14, one of the outer side surfaces 36 and/or one of the outer edges 38 will first be acted on, this arrangement of the armoring contributes to a further increase in the resistance of the housing 14 of the lock body 12 to unauthorized break-open attempts.

Figure 2E:
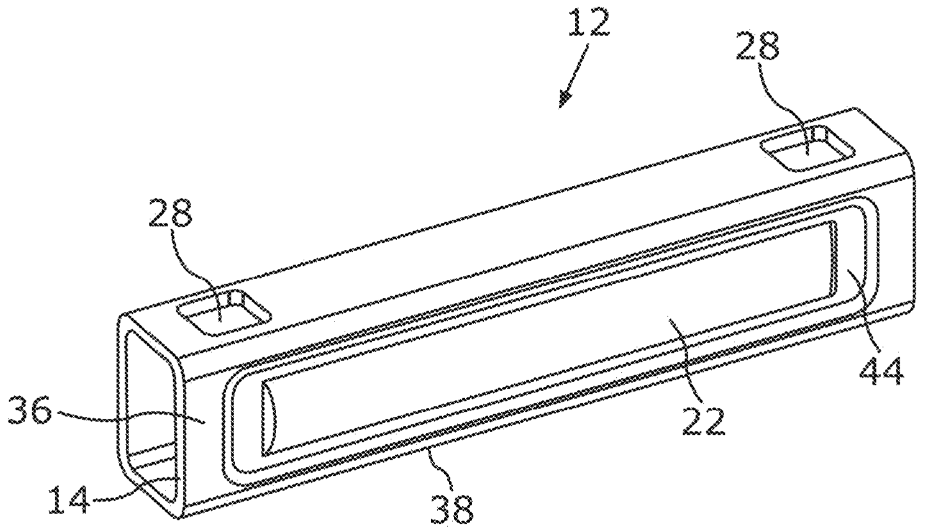
FIG. 2E a perspective view of the housing of FIG. 2C, wherein an armoring is formed in a depression provided at a side surface of the housing.

In accordance with a further variant shown in FIG. 2E, a respective armor bead 22 is formed in a depression 44 at oppositely disposed side surfaces of the housing 14. The depressions are in particular formed at the outer side surfaces 36 of the housing 14. Alternatively, the armor bead 22 can also be formed in only one of the depressions 44. Furthermore, such a housing 14 can additionally also have an armor bead 22, as it is shown in FIG. 2D, extending over at least approximately the total length of an outer edge 38 of the housing 14. It is understood that such an armor bead 22 formed in a depression can also be provided at only one of the side surfaces or also at all the side surfaces of the housing 14.

Figure 2F:
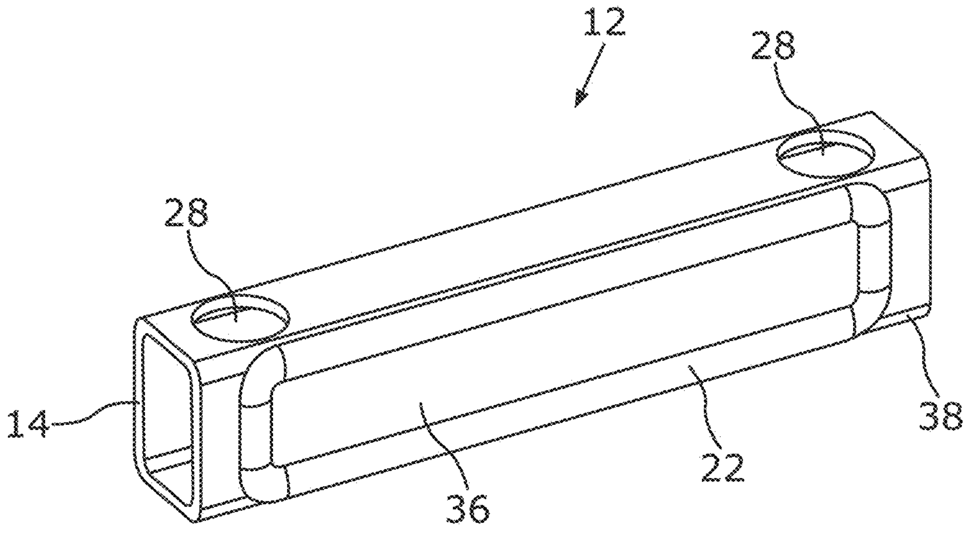
FIG. 2F a perspective view of the housing of FIG. 2C, wherein an armoring in the form of a peripheral armor bead is formed at a side surface of the housing.

In accordance with a further variant shown in FIG. 2F, a respective armoring in the form of a peripheral armor bead 22 is formed at oppositely disposed side surfaces of the housing 14. The armor beads 22 can in particular each form a self-contained, substantially rectangular shape. The side surfaces are preferably the outer side surfaces 36 of the housing 14. As can be seen in FIG. 2F, the armor beads 22 extend partly at the edges of the housing 14. However, an embodiment in which the armor beads 22 are arranged solely at the side surfaces, i.e. are therefore arranged spaced apart from the housing edges, is also conceivable. It is understood that such a peripheral armor bead 22 can also be provided at only one of the side surfaces or also at all the side surfaces of the housing 14.

Figure 3A:
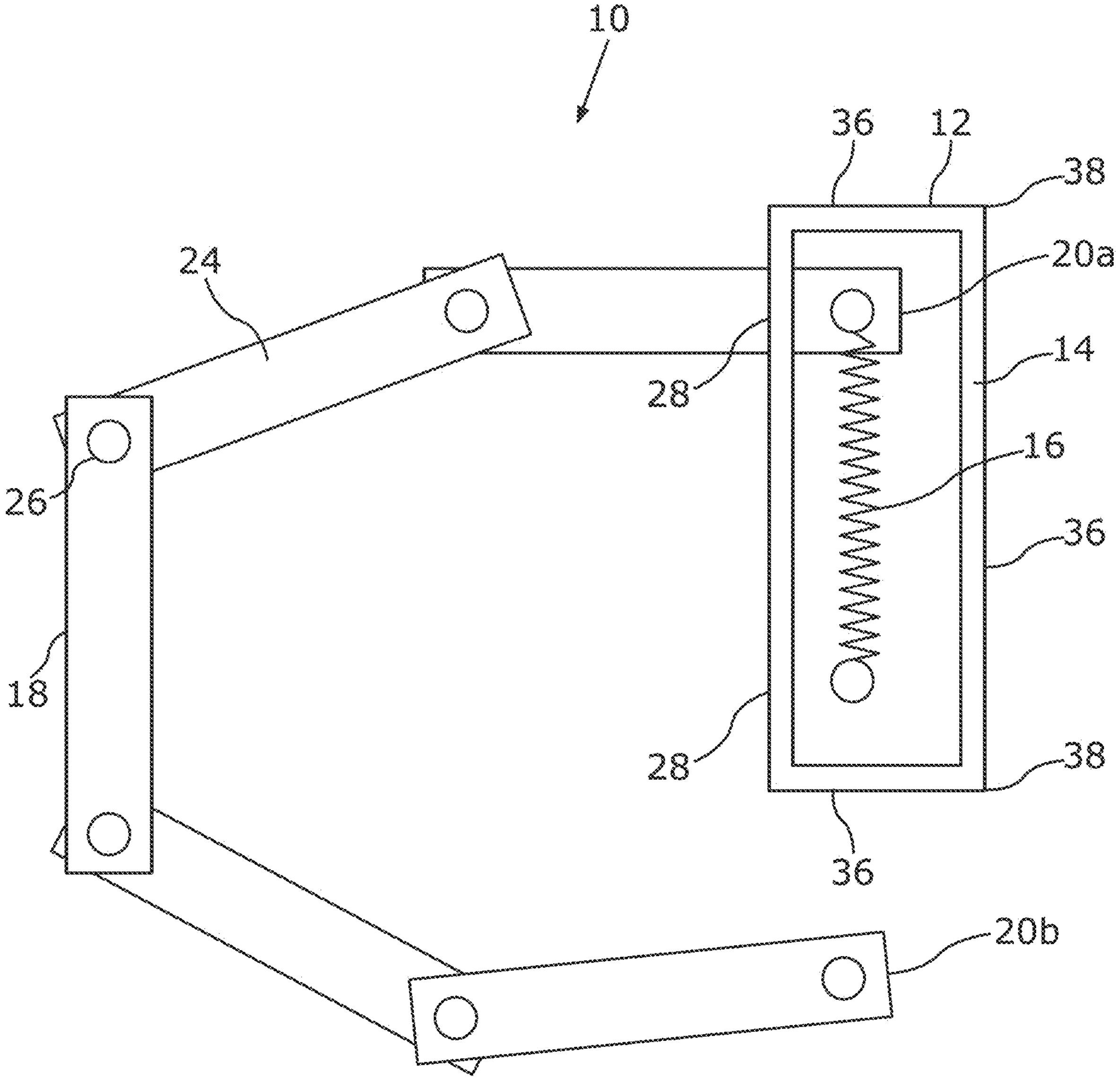
FIG. 3A a schematic plan view of a second embodiment of a hoop lock, wherein the hoop lock is a folding lock.

FIG. 3A shows a plan view of a second embodiment of a hoop lock 10 in accordance with the present disclosure that differs from the first embodiment shown in FIG. 1A substantially in that the closing hoop 18 is a jointed bar hoop that has a plurality of jointed bars 24 connected to one another in an articulated manner via rivets 26.

At least one of the jointed bars 24 of the closing hoop 18 has an armoring. An armor bead 22 in particular extends over at least approximately the total length of a narrow side 40 of the jointed bar 24 so that substantially the total jointed bar 24 is armored (FIG. 3B).

All the jointed bars 24 preferably have an armor bead 22 so that the closing hoop 18 is fully armored. For an even further increased resistance of the closing hoop 18, a respective two narrow sides 40 of a jointed bar 24 are provided with an armor bead 22.

Figure 3B:
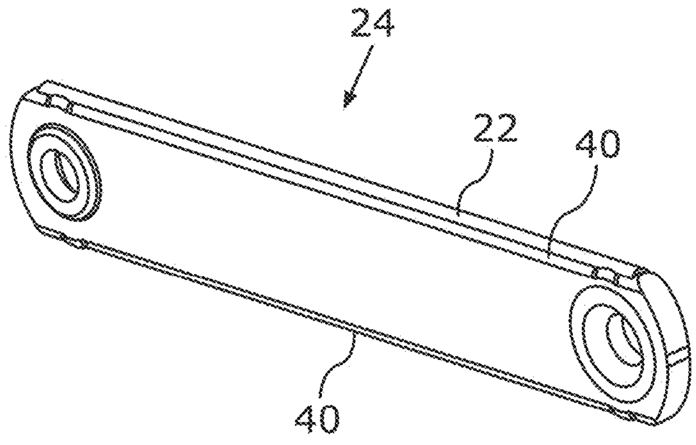
FIG. 3B a perspective view of a jointed bar of the hoop lock of FIG. 3A, wherein an armoring is formed at a narrow side of the jointed bar.
Figure 3C:
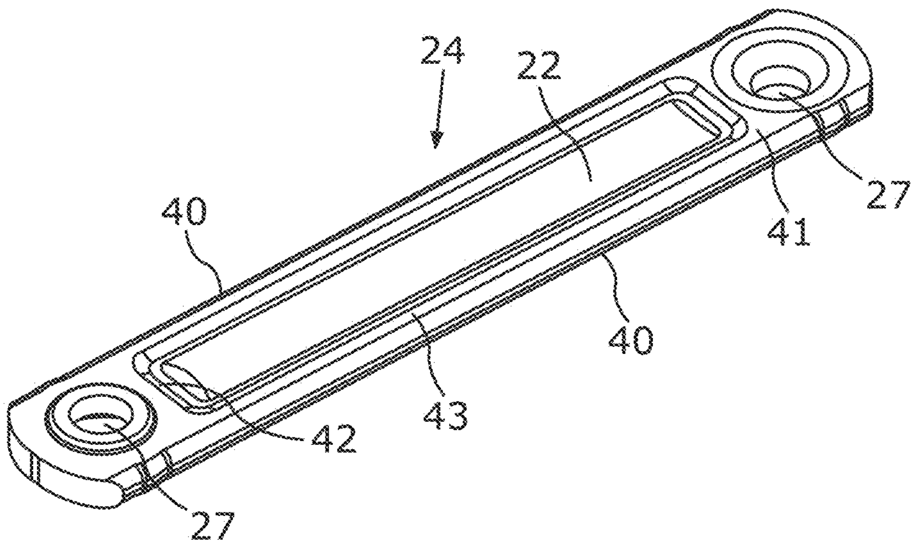
FIG. 3C a perspective view of a jointed bar of the hoop lock of FIG. 3A, wherein an armoring is formed in a depression provided at a side surface of the jointed bar.

In accordance with a further variant shown in FIG. 3C, a respective armor bead 22 is formed in a depression 42 at at least one side surface (here: broadside 41), in particular at mutually oppositely disposed side surfaces (in particular broadsides 41) of the jointed bar 24. The respective depression 42 and armor bead 22 extend in the longitudinal direction of the jointed bar 24, in particular in a straight line, up to just in front of the openings 27 for the respective articulated joint of the closing hoop 18 (cf. rivets 26 in accordance with FIG. 3A). The depression 42 is bounded at the respective side surface of the jointed bar 24 by a peripheral edge 43. Thus, the armor bead 22 is surrounded by the peripheral edge 43 and is hereby additionally protected at all sides.

Furthermore, such a closing hoop 18 can additionally also have an armor bead 22, as it is shown in FIG. 3B, extending over at least approximately the total length of a narrow side 40 of the jointed bar 24.

The armoring preferably comprises a hard metal that is suitable to be applied by way of buildup welding. This has the effect that the armoring can be even harder to remove, which in turn further increases the protective effect of the armoring.

Furthermore, the armoring can extend over the total length of the closing hoop 18 and over the total length of the housing 14. It can thereby be prevented that a cut-through tool can be applied to a surface section of the closing hoop 18 or of the lock body 12 at which no armor bead 22 is formed. This arrangement of the armoring makes the hoop lock 10 in accordance with the present disclosure even more secure against unauthorized break-open attempts.

It is understood that, in principle, only the closing hoop 18 or only the housing 14 of the lock body 12 of the hoop lock 10 in accordance with the present disclosure can have an armoring in order to reduce manufacturing costs. If a plurality of armor beads 22 are formed at the closing hoop 18 and/or the housing 14, the armor beads 22 can furthermore differ in their thickness 32 and/or in their width 30.

Furthermore, the armoring can be formed outwardly at the housing 14 and/or in the interior of the housing 14 of the lock body 12. If the armoring is outwardly formed at the housing 14, this has a deterrent effect since the hoop lock 10 thus appears more robust and therefore more difficult to break open. This in turn reduces the likelihood of unauthorized break-open attempts. The same applies if the armoring is visibly formed at the closing hoop 18. If the armoring is formed in the interior of the housing 14 so that the armoring is not visible from the outside, this improves the visual appearance of the hoop lock 10.

REFERENCE NUMERAL LIST

10 hoop lock
12 lock body
14 housing
16 locking apparatus
18 closing hoop
20*a* first end of the closing hoop
20*b* second end of the closing hoop
22 armor bead
24 jointed bar
26 rivet
27 opening for articulated joint
28 closing opening
30 width of the armor bead
32 height of the armor bead
34 outer side surface of the closing hoop
36 outer side surface of the housing
38 outer edge of the housing
40 narrow side
41 broad side
42 depression of the jointed bar
43 peripheral edge
44 depression of the housing

The invention claimed is:

1. A hoop lock comprising:

a lock body that comprises a housing and a locking apparatus accommodated in the housing; and a closing hoop that has at least one end that is selectively locked to the lock body or released from the lock body by way of the locking apparatus, wherein an armoring is applied to at least one of the closing hoop and the housing of the lock body by way of buildup welding;

wherein the armoring comprises a hard metal.

2. The hoop lock in accordance with claim 1, wherein the armoring is formed in the form of at least one armor bead.

3. The hoop lock in accordance with claim 2, wherein the armor bead has a width between 5 mm and 10 mm.

4. The hoop lock in accordance with claim 2, wherein the armor bead extends over at least approximately the total length of the housing and/or over at least approximately the total length of the closing hoop.

5. The hoop lock in accordance with claim 2, wherein the armor bead is a continuous armor bead.

6. The hoop lock in accordance with claim 2, wherein the at least one armor bead has a thickness between 0.5 and 5 mm.

7. The hoop lock in accordance with claim 2, wherein the armor bead is formed by a plurality of segments spaced apart from one another.

8. The hoop lock in accordance with claim 1, wherein the armoring is formed at at least one of a side surface and an edge of the housing (14).

9. The hoop lock in accordance with claim 7, wherein the armoring is formed at an outer side surface of the housing.

10. The hoop lock in accordance with claim 8, wherein the armoring is formed at an outer edge of the housing.

11. The hoop lock in accordance with claim 1, wherein the armoring is formed centrally at at least one side surface of the housing, at at least one side surface of the housing offset from its center, in the region of at least one edge of the housing, and/or partly or completely at at least one edge of the housing.

12. The hoop lock in accordance with claim 1, wherein at least two side surfaces of the housing and/or at least two side surfaces of the closing hoop are provided with an armoring.

13. The hoop lock in accordance with claim 12, wherein at least two oppositely disposed side surfaces of the housing are provided with an armoring.

14. The hoop lock in accordance with claim 1, wherein the armoring is formed in a depression provided at a side surface of the housing.

15. The hoop lock in accordance with claim 1, wherein the closing hoop is formed by a plurality of jointed bars connected to one another in an articulated manner and the armoring is formed at at least one of the jointed bars.

16. The hoop lock in accordance with claim 15, wherein the armoring is formed at a narrow side of the jointed bar.

17. The hoop lock in accordance with claim 15, wherein the armoring is formed in a depression provided at a side surface of the jointed bar.

18. The hoop lock in accordance with claim 1, wherein the armoring is formed at at least one of a side surface and an edge of the closing hoop.

19. The hoop lock in accordance with claim 18, wherein the armoring is formed at an outer side surface of the closing hoop.

20. The hoop lock in accordance with claim 18, wherein the armoring is formed at an outer edge of the closing hoop.

* * * * *